(12) United States Patent
Kawate et al.

(10) Patent No.: US 12,018,732 B2
(45) Date of Patent: Jun. 25, 2024

(54) HYDRAULIC DAMPER

(71) Applicant: Hitachi Astemo, Ltd., Hitachinaka (JP)

(72) Inventors: Isamu Kawate, Hitachinaka (JP); Kenta Kotera, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 399 days.

(21) Appl. No.: 17/394,992

(22) Filed: Aug. 5, 2021

(65) Prior Publication Data
US 2021/0364058 A1 Nov. 25, 2021

Related U.S. Application Data

(63) Continuation of application No. PCT/JP2019/009336, filed on Mar. 8, 2019.

(51) Int. Cl.
*F16F 9/34* (2006.01)
*F16F 9/18* (2006.01)
*F16F 9/32* (2006.01)
*F16F 9/348* (2006.01)

(52) U.S. Cl.
CPC ............ *F16F 9/185* (2013.01); *F16F 9/3285* (2013.01); *F16F 9/3485* (2013.01)

(58) Field of Classification Search
CPC ........ F16F 9/185; F16F 9/3285; F16F 9/3485; F16F 9/3214; F16F 9/34
See application file for complete search history.

(56) References Cited

U.S. PATENT DOCUMENTS

| | | | |
|---|---|---|---|
| 5,248,014 A | * | 9/1993 | Ashiba .................. F16F 9/50 |
| | | | 188/282.8 |
| 2014/0060315 A1 | | 3/2014 | Mori |

FOREIGN PATENT DOCUMENTS

| | | |
|---|---|---|
| JP | 09-196107 A | 7/1997 |
| JP | 2011-202789 A | 10/2011 |
| JP | 2013-113306 A | 6/2013 |
| JP | 2014-047829 A | 3/2014 |
| JP | 2014-092176 A | 5/2014 |

OTHER PUBLICATIONS

Machine translation of JP 2011-202789 (no date).*
International Search Report dated Apr. 2, 2019 for the corresponding PCT International Patent Application No. PCT/JP2019/009336.

* cited by examiner

*Primary Examiner* — Nicholas J Lane
(74) *Attorney, Agent, or Firm* — Leason Ellis LLP; Edward J. Ellis; Melvin C. Garner (57) ABSTRACT

A hydraulic damper includes: a rod that is inserted into a cylinder containing liquid; a piston that is connected to the rod and partition the cylinder into a first liquid chamber and a second liquid chamber; a channel forming part having a channel between the first liquid chamber and the second liquid chamber; a valve part configured to open and close the channel and generate damping force; and a damping force changer including an inflow part into which the liquid flows and configured to change the damping force by using liquid pressure in the inflow part. The damping force changer includes: a pressure changing part that changes the liquid pressure in the inflow part by being deformed or displaced; a support part that supports the pressure changing part; and an inflow forming part that holds the support part and forms the inflow part jointly with the support part.

9 Claims, 9 Drawing Sheets

HYDRAULIC DAMPER

CROSS-REFERENCE TO RELATED APPLICATION

This application is a Continuation of the International Application No. PCT/JP2019/009336 filed on Mar. 8, 2019, the content of which is incorporated herein by reference in its entirety.

FIELD OF THE INVENTION

The present invention relates to a hydraulic damper.

BACKGROUND OF THE INVENTION

For example, Japanese Patent Application Laid-Open Publication No. 2014-047829 discloses a hydraulic damper including: a cylinder unit containing liquid; a piston valve configured to partition a space inside the cylinder unit into a first oil chamber and a second oil chamber each containing oil; a piston rod connected to the piston valve and configured to move in an axial direction of the cylinder unit; a piston nut configured to form liquid channels between the first oil chamber and the second oil chamber; and a float valve configured to be deformed or displaced in response to pressure of oil inside the channels of the piston nut and open and close the channels.

CITATION LIST

Patent Literature

Patent Literature 1: Japanese Patent Application Laid-Open Publication No. 2014-047829

Technical Problem

By the way, making a hydraulic damper capable of changing damping force generated therefrom requires, for example, a larger number of parts used, and this may complicate a manufacturing process for the hydraulic damper.

An object of the present invention is to facilitate the manufacturing of a hydraulic damper configured to be capable of changing damping force generated therefrom.

SUMMARY OF THE INVENTION

Solution to Problem

With the above object in view, an aspect of the present invention is a hydraulic damper including: a rod configured to be inserted into a cylinder containing liquid, the rod being provided so as to be movable relative to the cylinder in an axial direction; a piston configured to be connected to the rod and partition a space inside the cylinder into a first liquid chamber and a second liquid chamber each containing the liquid; a channel forming part configured to form a channel for the liquid between the first liquid chamber and the second liquid chamber; a valve part configured to open and close the channel in the channel forming part and generate damping force; and a damping force changer including an inflow part into which the liquid flows, the damping force changer being configured to change the damping force generated in the valve part by using pressure of the liquid in the inflow part The damping force changer includes: a pressure changing part configured to change pressure of the liquid in the inflow part by being deformed or displaced; a support part configured to support the pressure changing part; and an inflow forming part configured to hold the support part by a crimped portion that is crimped and to form the inflow part jointly with the support part.

Advantageous Effects of Invention

The present invention facilitates the manufacturing of a hydraulic damper configured to be capable of changing damping force generated therefrom.

DETAILED DESCRIPTION OF THE INVENTION

An exemplary embodiment of the present invention will be described below in detail with reference to the attached drawings.

Figure 1:
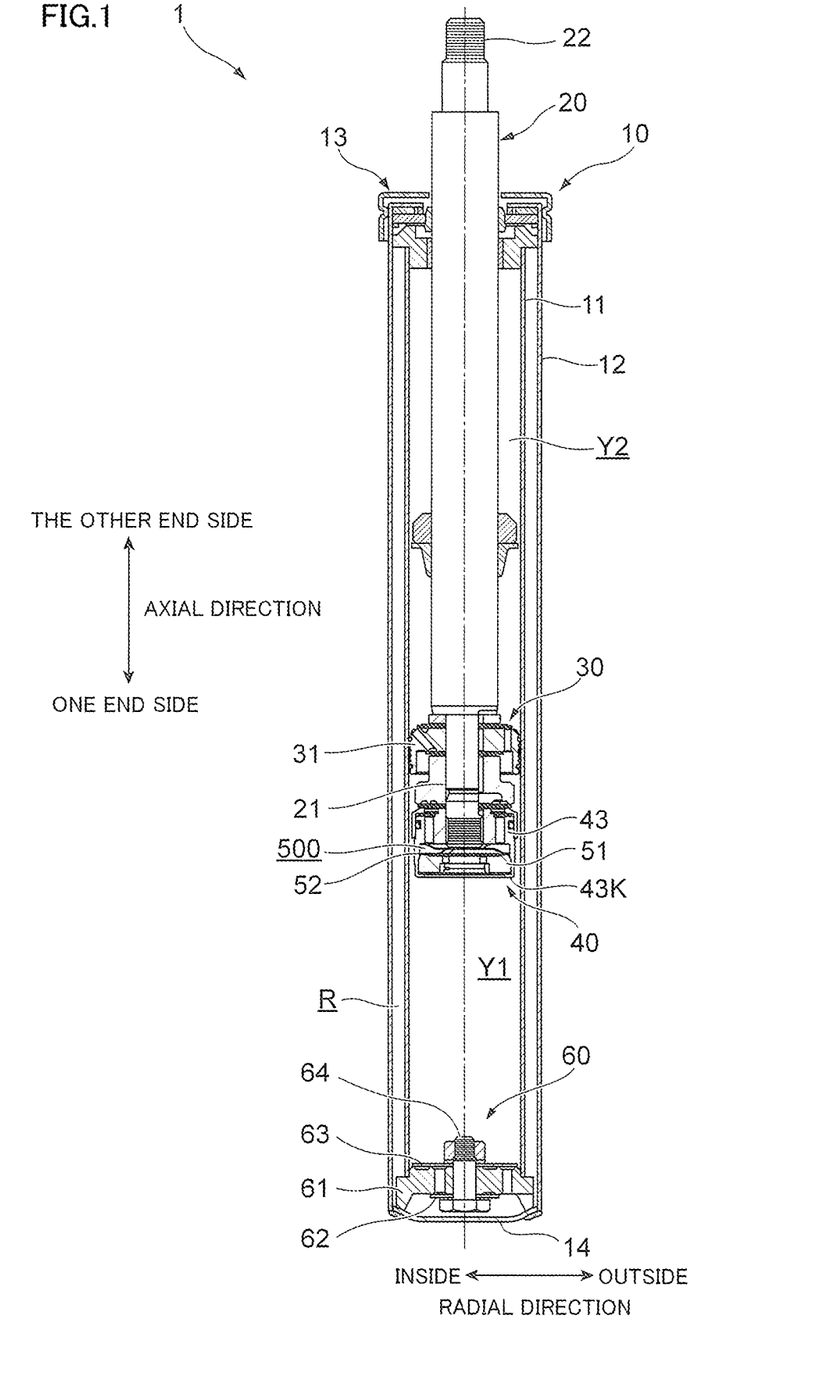
FIG. 1 is an entire view of a hydraulic damper of an exemplary embodiment.

FIG. 1 is an entire view of a hydraulic damper 1 of the present embodiment.

Figure 2:
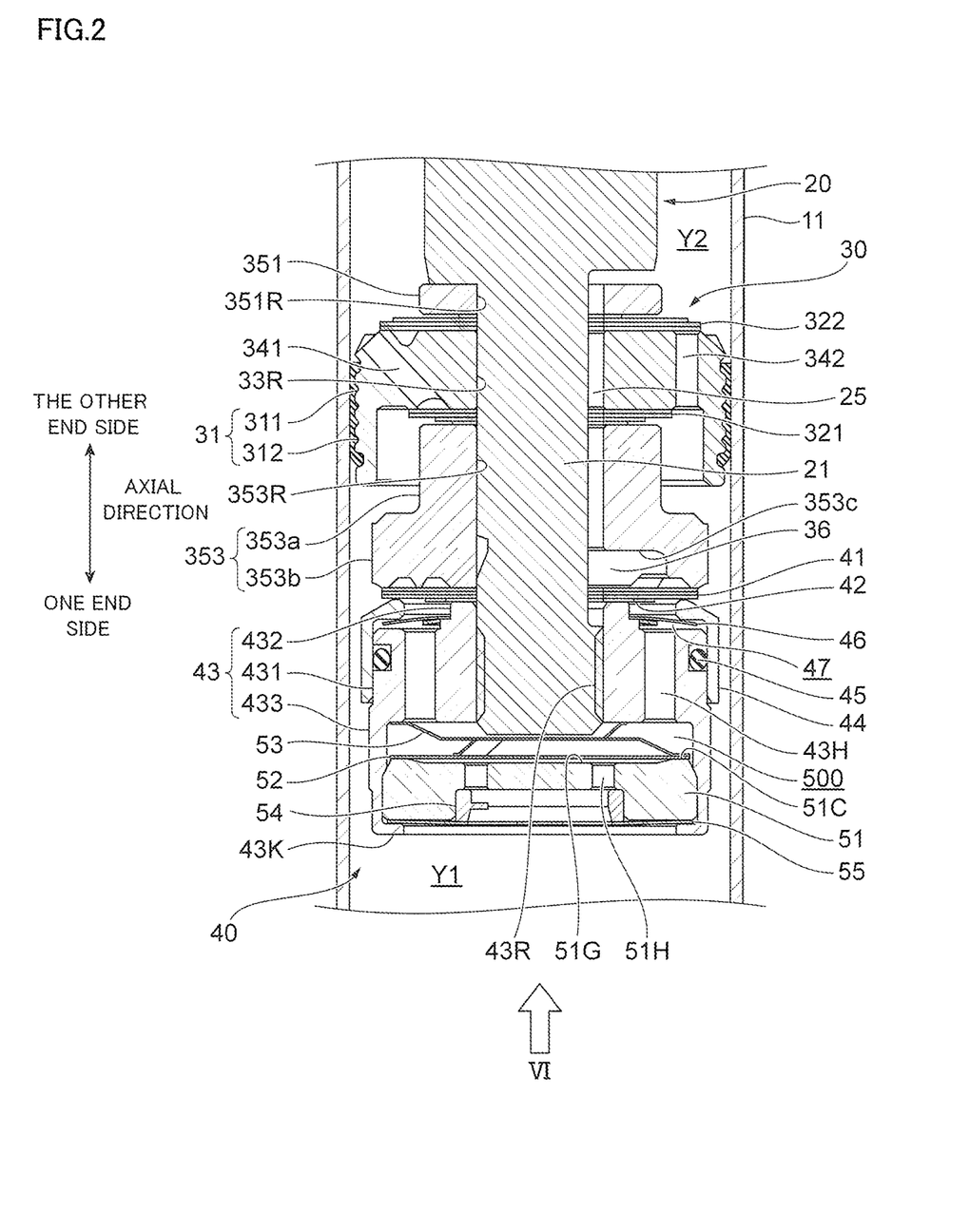
FIG. 2 is a sectional view of a piston unit and a damping force changer of the embodiment.

FIG. 2 is a sectional view of a piston unit 30 and a damping force changer 40 of the present embodiment.

As shown in FIG. 1, the hydraulic damper 1 (an example of the hydraulic damper) includes: a cylinder unit 10 containing oil (an example of the liquid); a rod 20 slidably inserted into the cylinder unit 10 from the other end side of the cylinder unit 10; a piston unit 30 connected to one end of the rod 20; a damping force changer 40 configured to adjust damping force generated in the piston unit 30; and a bottom piston unit 60 provided at one end of the cylinder unit 10.

The damping force changer 40 (an example of the damping force changer) includes: a float valve 52 (an example of a pressure changing part) configured to change pressure of liquid within a pressure adjustment chamber 500 (an example of an inflow part) by being deformed or displaced; an end cap 51 (an example of the support part) configured to support the float valve 52; and a piston nut 43 (an example of the inflow forming part) configured to hold the end cap 51 by a crimped portion 43K (an example of the crimped portion) that is crimped and to form the pressure adjustment chamber 500 jointly with the end cap 51. Hereinafter, the hydraulic damper 1 will be described in detail.

The hydraulic damper 1 of the present embodiment is a twin-tube type hydraulic damper that is used along with a spring and constitutes a part of a suspension (suspension device). The hydraulic damper 1 of the present embodiment is, for example, used for vehicles such as four-wheelers and motorcycles and mitigates or absorbs vertical motions of a wheel to prevent vibrations from being directly transmitted to a vehicle body.

In the following description, the longitudinal direction of the hydraulic damper 1 may be referred to as an "axial direction". The lower side in the axial direction may be referred to as "one end side", and the upper side in the axial direction may be referred to as the "other end side". The transverse direction of the hydraulic damper 1 may be referred to as a "radial direction". In the radial direction, the side radially closer to the center axis may be referred to as an "inside in the radial direction", and the side radially away from the center axis may be referred to as an "outside in the radial direction". The rotational direction of the hydraulic damper 1 about its axial direction may be referred to as a "circumferential direction".

[Configuration and Functions of the Cylinder Unit 10]

As shown in FIG. 1, the cylinder unit 10 includes a cylinder 11 of a cylindrical shape, a damper case 12 of a cylindrical shape disposed at the outside in the radial direction of the cylinder 11, a rod guide unit 13 disposed at the other end of the cylinder unit 10, and a bottom cover 14 disposed at the one end of the cylinder unit 10.

The cylinder 11 accommodates one end of the rod 20, the piston unit 30, and the damping force changer 40 such that they can move in the axial direction. The damper case 12 forms a reservoir chamber R at the inside in the radial direction thereof between the damper case 12 and the cylinder 11. The rod guide unit 13 closes openings at the other ends of the cylinder 11 and the damper case 12. The rod guide unit 13 allows the rod 20 to pass therethrough and supports the rod 20 such that it can move in the axial direction. The bottom cover 14 closes openings at the one ends of the cylinder 11 and the damper case 12.

[Configuration and Functions of the Rod 20]

The rod 20 is a solid or hollow rod-shaped member. The rod 20 includes a one end-side mounting portion 21 at its one end and an other end-side mounting portion 22 at its other end. Outer surfaces of the one end-side mounting portion 21 and the other end-side mounting portion 22 are helically grooved to form male threads thereon, so that they serve as bolts.

As shown in FIG. 2, the rod 20 is provided with a bypass path 25 at the one end-side mounting portion 21. The bypass path 25 is defined by a groove extending in the axial direction and allows oil to bypass the piston unit 30 to flow between the second oil chamber Y2 and the first oil chamber Y1.

[Configuration and Functions of the Piston Unit 30]

As shown in FIG. 2, the piston unit 30 includes a valve seat 31, a tension-side damping valve part 321 provided at the one end side of the valve seat 31, and a compression-side damping valve part 322 provided at the other end side of the valve seat 31. The piston unit 30 further includes a first valve stopper 351 and a second valve stopper 353.

The valve seat 31 (an example of the channel forming part) includes a columnar portion 311 of a generally columnar shape formed with a plurality of oil channels (described later) and a cylindrical portion 312 of a cylindrical shape provided at the one end side of the columnar portion 311.

The valve seat 31 contacts the cylinder 11 via a sliding portion that is provided at the outside in the radial direction to reduce friction resistance. The piston unit 30 partitions the space inside the cylinder 11 containing oil into the first oil chamber Y1 on the one end side and the second oil chamber Y2 on the other end side.

The valve seat 31 further includes a mounting hole 33R allowing for insertion of the rod 20 therethrough, and tension-side oil channels 341 and compression-side oil channels 342 formed radially outside of the mounting hole 33R. The plurality of tension-side oil channels 341 and the plurality of compression-side oil channels 342 are provided at substantially equal intervals in the circumferential direction. The tension-side oil channels 341 and the compression-side oil channels 342 permit oil flow between the first oil chamber Y1 and the second oil chamber Y2.

The tension-side damping valve part 321 may be composed of a plurality of elastic, generally disk-like planar members. The tension-side damping valve part 321 opens or closes one ends of the tension-side oil channels 341 while leaving one ends of the compression-side oil channels 342 always open.

The compression-side damping valve part 322 may be composed of a plurality of elastic, generally disk-like planar members. The compression-side damping valve part 322 opens or closes the other ends of the compression-side oil channels 342 while leaving the other ends of the tension-side oil channels 341 always open.

The first valve stopper 351 includes a mounting hole 351R for allowing the rod 20 to pass therethrough.

The second valve stopper 353 includes a first outer diameter portion 353a with a predetermined outer diameter and a second outer diameter portion 353b with a larger outer diameter than that of the first outer diameter portion 353a. The second valve stopper 353 is provided such that the first outer diameter portion 353a is situated inside the cylindrical portion 312 of the valve seat 31. The second valve stopper 353 prevents the tension-side damping valve part 321 from being deformed to a certain degree or more when it is deformed. The second valve stopper 353 also serves as a valve seat for an adjustment valve 41 (described later).

The second valve stopper 353 includes a mounting hole 353R extending in the axial direction and having an inner diameter that allows the one end-side mounting portion 21 of the rod 20 to pass through the hole 353R. Additionally, the second valve stopper 353 is provided with a recess 353c that opens toward the adjustment valve 41 (described later).

The second valve stopper 353 has the one end-side mounting portion 21 fitted in the mounting hole 353R and has the tension-side damping valve part 321 sandwiched between the second valve stopper 353 and the valve seat 31. The recess 353c of the second valve stopper 353 forms a discharge channel 36 in communication with the bypass path 25.

[Configuration and Functions of the Damping Force Changer 40]

Figure 3A:
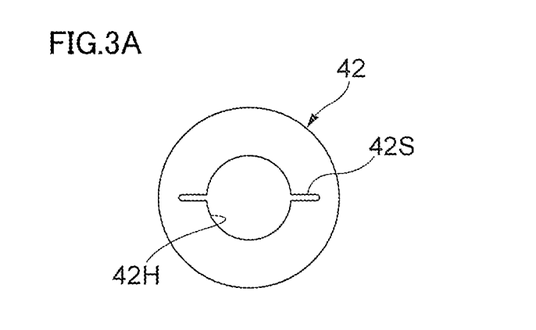
FIGS. 3A and 3B are top views of a throttle member and a support spring, respectively, of the embodiment.
Figure 3B:
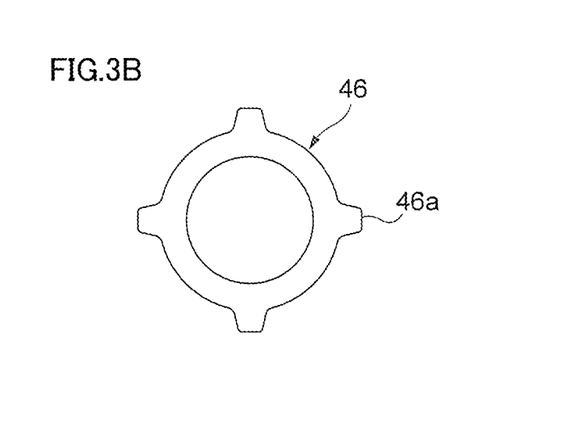

FIGS. 3A and 3B are top views of a throttle member 42 and a support spring 46, respectively, of the present embodiment.

Figure 4:
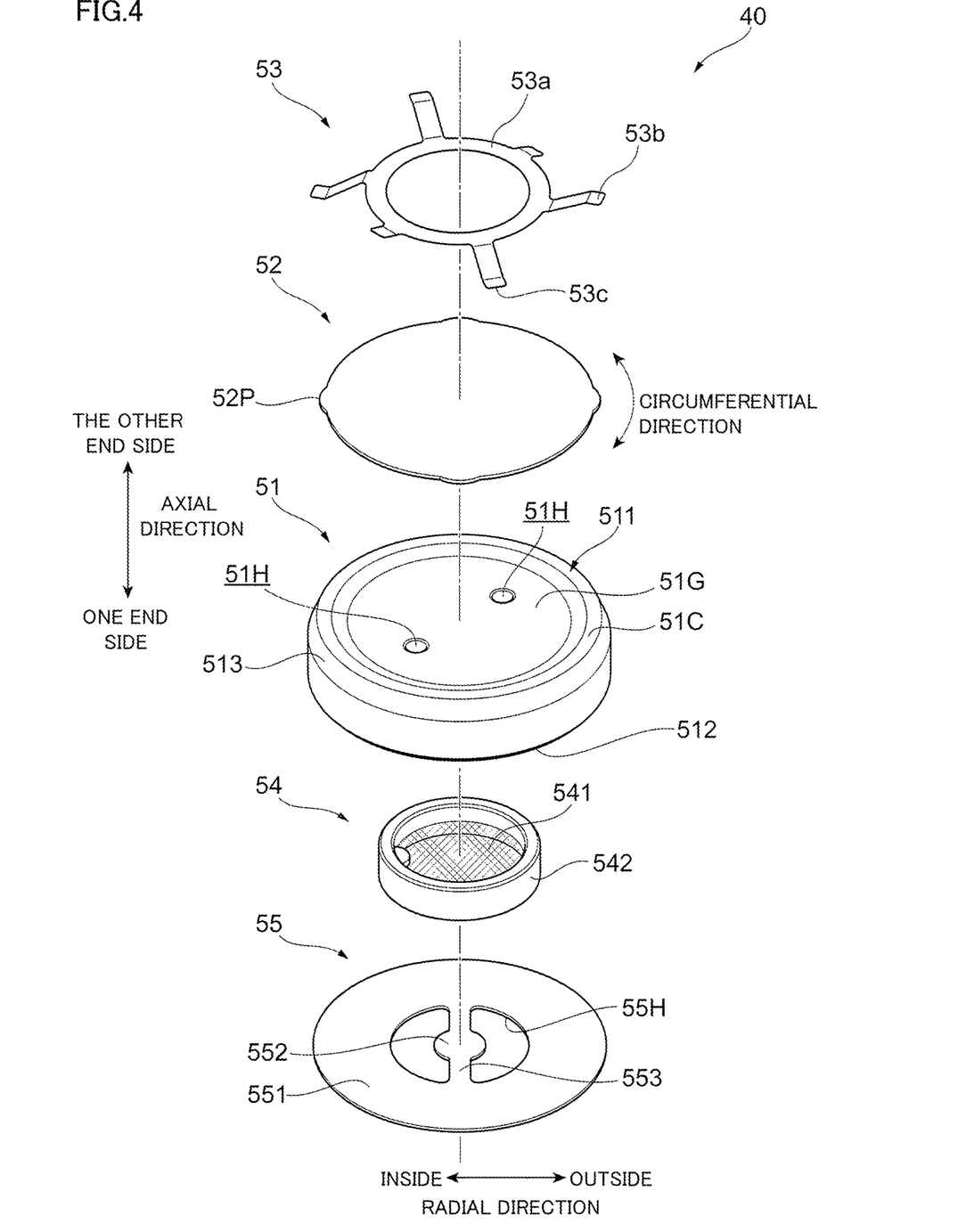
FIG. 4 is a perspective view of components of the damping force changer of the embodiment.

FIG. 4 is a perspective view of components of the damping force changer 40 of the present embodiment.

Figure 5:
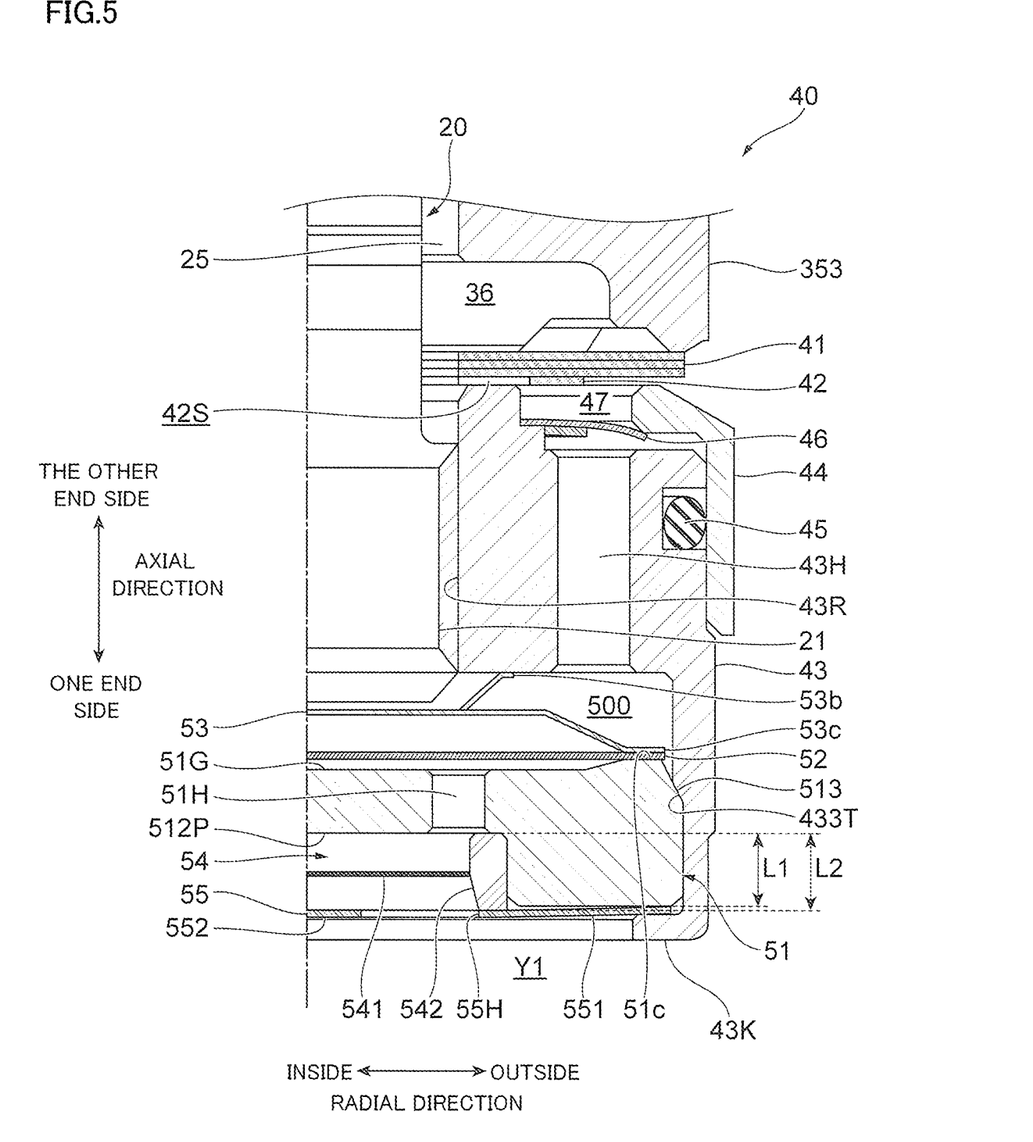
FIG. 5 illustrates the damping force changer of the embodiment.

FIG. 5 illustrates the damping force changer 40 of the present embodiment.

Figure 6:
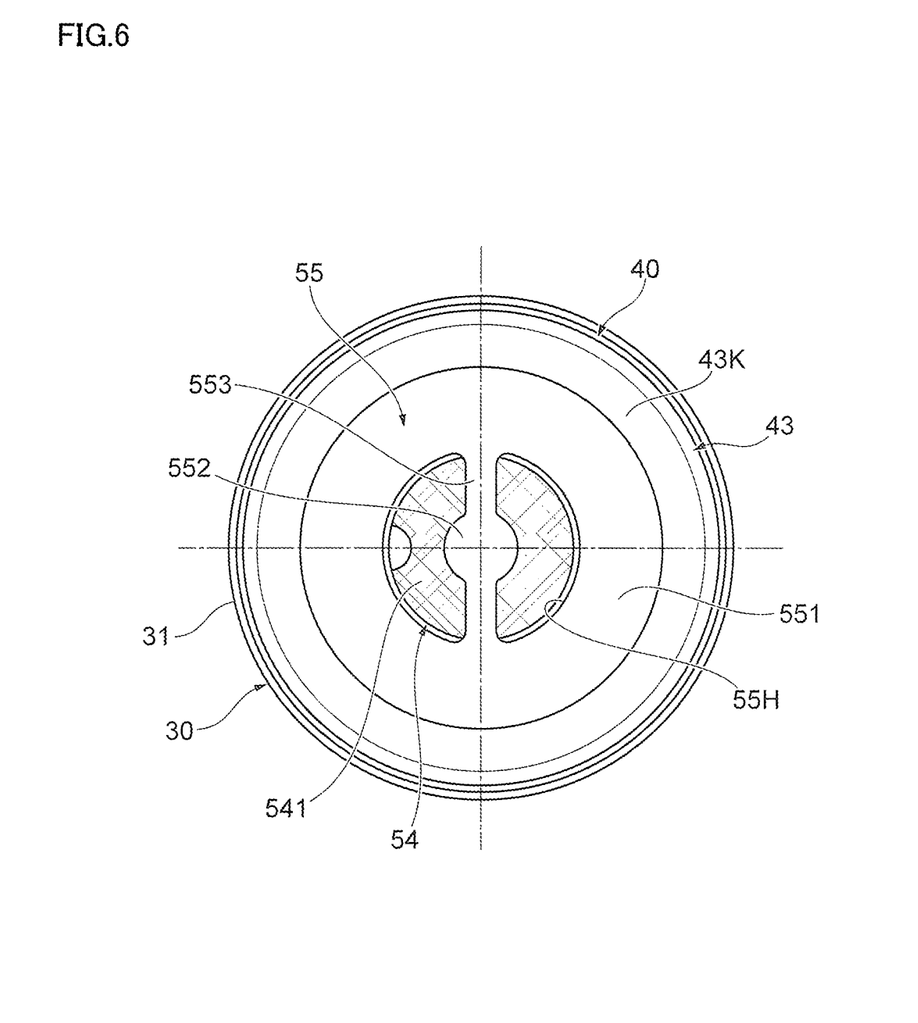
FIG. 6 is a bottom view of the piston unit and the damping force changer as viewed in the direction of an arrow VI in FIG. 2.

FIG. 6 is a bottom view of the piston unit 30 and the damping force changer 40 as viewed in the direction of an arrow VI in FIG. 2.

As shown in FIG. 2, the damping force changer 40 includes an adjustment valve 41 configured to control oil flow in the bypass path 25, a throttle member 42 configured to throttle oil flow in the bypass path 25, and a piston nut 43 connected to the rod 20. The damping force changer 40 further includes a spool 44 provided such that it can move with respect to the piston nut 43, an O-ring 45 configured to seal a gap between the piston nut 43 and the spool 44, and a support spring 46 configured to apply spring force to the spool 44.

The damping force changer 40 further includes an end cap 51 configured to form a pressure adjustment chamber 500 jointly with the piston nut 43, a float valve 52 configured to change pressure of oil inside the pressure adjustment chamber 500, and a pressure adjustment chamber spring 53. The damping force changer 40 further includes a filter part 54 configured to filter oil and a filter pressing part 55 configured to press the filter part 54.

The adjustment valve 41 closes the discharge channel 36 while covering the recess 353c of the second valve stopper 353. Once the adjustment valve 41 deforms to render the recess 353c uncovered, the adjustment valve 41 opens the discharge channel 36 and lets oil flow from the second oil chamber Y2 into the first oil chamber Y1 through the bypass path 25 and the discharge channel 36.

As shown in FIG. 3A, the throttle member 42 is elastic and formed in an annular shape. The throttle member 42 includes, at the inside in the radial direction, an opening 42H allowing for the one end-side mounting portion 21 of the rod 20 to pass therethrough. The throttle member 42 further includes orifices 42S that are cut outward from the opening 42H. Along with the adjustment valve 41, the throttle member 42 is provided between the second valve stopper 353 and the piston nut 43. As shown in FIG. 5, each of the orifices 42S extends to reach a pressure chamber 47 (described later). Also, each of the orifices 42S is in communication with a lower end of the bypass path 25.

While in the present embodiment, two orifices 42S are provided in the circumferential direction, the number of orifices, length, slit width, and other parameters may be set as appropriate.

(Piston Nut 43)

As shown in FIG. 2, the piston nut 43 includes a columnar portion 431, an annular protrusion 432 provided at the other end side of the columnar portion 431, and a cylindrical portion 433 provided at the one end side of the columnar portion 431.

The columnar portion 431 includes a bolt hole 43R that is a through-hole extending in the axial direction and fitted with the one end-side mounting portion 21 of the rod 20, and communication paths 43H adjacent to the bolt hole 43R and penetrating the columnar portion 431 in the axial direction from an end thereof closer to the annular protrusion 432 to the other end thereof closer to the cylindrical portion 433. In the present embodiment, a plurality of communication paths 43H are provided in the circumferential direction of the piston nut 43.

As shown in FIG. 5, the cylindrical portion 433 includes a nut tapered portion 433T (an example of the second tapered portion) on its inner surface. The nut tapered portion 433T is inclined with respect to the axial direction such that the nut tapered portion 433T faces the one end side. In other words, the nut tapered portion 433T of the present embodiment is formed such that its inner diameter gradually reduces from the one end side to the other end side. Also, the nut tapered portion 433T of the present embodiment conforms to an inclination angle of a cap tapered portion 513 (described later). The nut tapered portion 433T faces the cap tapered portion 513.

The piston nut 43 is supported by the rod 20 as the bolt hole 43R is fitted with the one end-side mounting portion 21. The piston nut 43 includes a crimped portion 43K at the one end of the cylindrical portion 433. The crimped portion 43K is formed by roll-crimping and plastically deforming an end of the straight cylindrical portion 433. The piston nut 43 of the present embodiment allows various members constituting the damping force changer 40 and the piston unit 30 to be held at the rod 20.

A further description of how the crimped portion 43K of the piston nut 43 is used to hold the components will be given later.

The communication paths 43H provide communication between the pressure chamber 47 (described later) and the pressure adjustment chamber 500 and form oil channels between the pressure chamber 47 and the pressure adjustment chamber 500.

The spool 44 has a generally cylindrical shape. The other end of the spool 44 protrudes radially inward, and the columnar portion 431 of the piston nut 43 is inserted into the spool 44 from one end thereof.

The spool 44 can be in contact with the adjustment valve 41 at the other end of the spool 44 and is also urged by the support spring 46 at the other end. The spool 44 applies force to the adjustment valve 41 by which the adjustment valve 41 is pressed against one end of the second valve stopper 353.

The spool 44 forms the pressure chamber 47 jointly with the piston nut 43 and the adjustment valve 41.

The O-ring 45 is attached to the piston nut 43 and supports the spool 44 such that the spool 44 can move in the axial direction.

As shown in FIG. 3B, the support spring 46 is formed in a ring shape and includes, on its outer periphery, a plurality of protrusions 46a protruding radially outward. The support spring 46 is supported at its inner periphery by the annular protrusion 432 of the piston nut 43. As shown in FIG. 5, the support spring 46 urges the spool 44 toward the other end side.

(End Cap 51)

As shown in FIG. 2, the end cap 51 has an outer diameter slightly smaller than the inner diameter of the cylindrical portion 433 of the piston nut 43. The end cap 51 is inserted inside the cylindrical portion 433 of the piston nut 43. In the state where the end cap 51 is inserted inside the cylindrical portion 433 of the piston nut 43, the end cap 51 forms the pressure adjustment chamber 500 as a space between the end cap 51 and the cylindrical portion 433. The pressure adjustment chamber 500 accommodates the float valve 52 and the pressure adjustment chamber spring 53.

As shown in FIG. 4, the end cap 51 includes a valve facing portion 511 provided at the other end side and facing the float valve 52, a filter retaining portion 512 provided at the one end side and retaining the filter part 54, and a cap tapered portion 513 provided at the other end side.

The valve facing portion 511 includes an annular protrusion 51C formed at the other end side, a deformation restricting portion 51G formed at the other end side, and through-holes 51H extending in the axial direction. As shown in FIG. 5, the valve facing portion 511 supports the float valve 52.

The annular protrusion 51C protrudes in an annular shape toward the other end side in the axial direction. An outer edge of the float valve 52 is held between the annular protrusion 51C and the pressure adjustment chamber spring 53 (described later).

The deformation restricting portion 51G is provided at the inside in the radial direction of the annular protrusion 51C and depressed toward the one side relative to the annular protrusion 51C. As shown in FIG. 5, the deformation restricting portion 51G permits a certain amount of deformation of the float valve 52 when the valve 52 undergoes deflection, but restricts the float valve 52 from being deformed more than the certain amount.

The through-holes 51H are provided in the valve facing portion 511 so as to penetrate it. A plurality of (e.g., two) through-holes 51H are provided in the present embodiment. Each through-hole 51H opens at the deformation restricting portion 51G at the other end side and opens at a retaining surface 512P of the filter retaining portion 512 at the one end side. The through-holes 51H permit oil flow between the pressure adjustment chamber 500 and the first oil chamber Y1.

As shown in FIG. 5, the cap tapered portion 513 (an example of the first tapered portion) is formed at the outside in the radial direction of the annular protrusion 51C. The cap tapered portion 513 is inclined with respect to the axial direction such that the cap tapered portion 513 faces the other end side. In other words, the cap tapered portion 513 of the present embodiment is formed such that its outer diameter gradually reduces from the one end side to the other end side. Also, the cap tapered portion 513 of the present embodiment conforms to the inclination angle of the nut tapered portion 433T. The cap tapered portion 513 faces the nut tapered portion 433T.

(Float Valve 52)

As shown in FIG. 4, the float valve 52 is an elastic planar member formed in a disk shape. The float valve 52 of the present embodiment includes, on its outer periphery, a plurality of protrusions 52P protruding radially outward. As shown in FIG. 5, the float valve 52 is urged by the pressure adjustment chamber spring 53 toward the end cap 51.

The float valve 52 can move against urging force of the pressure adjustment chamber spring 53 (described later) and can be displaced in the axial direction and in a direction perpendicular to the axial direction. The float valve 52 can be deformed to contact the deformation restricting portion 51G as it receives pressure while contacting the annular protrusion 51C of the end cap 51.

As described above, the float valve 52 changes the volume of the pressure adjustment chamber 500 by being deformed or displaced during a tension stroke and a compression stroke. Also, the float valve 52 blocks or permits oil flow between the pressure adjustment chamber 500 and the first oil chamber Y1 by closing the through-holes 51H of the end cap 51.

As shown in FIG. 4, the pressure adjustment chamber spring 53 includes a planar annular portion 53a, and a plurality of upward spring legs 53b and downward spring legs 53c that are radially provided.

As shown in FIG. 5, the pressure adjustment chamber spring 53 is mounted such that its upward spring legs 53b face the end face of the cylindrical portion 433 of the piston nut 43, and urges the float valve 52 toward the annular protrusion 51C with the downward spring legs 53c.

(Filter Part 54)

As shown in FIG. 4, the filter part 54 includes a filter membrane 541 configured to filter oil and a support frame 542 configured to support the filter membrane 541.

The filter membrane 541 is a thin planar member formed substantially in a disk shape. The filter membrane 541 has a mesh size that allows oil used in the present embodiment to pass therethrough and collects foreign matters and the like contained in the oil.

The support frame 542 is a member formed in a substantially cylindrical shape. As shown in FIG. 5, the support frame 542 supports the disk-shaped filter membrane 541 at the center in the axial direction. The end cap 51 of the present embodiment has a length L1 from the retaining surface 512P to the one end of the filter retaining portion 512. Meanwhile, the width of the support frame 542 in the axial direction, namely a length of the filter part 54 from the retaining surface 512P to the one end of the filter part 54 is set to a length L2. At the one end side of the damping force changer 40, the filter part 54 of the present embodiment protrudes farther toward the filter pressing part 55 than the end cap 51.

(Filter Pressing Part 55)

As shown in FIG. 4, the filter pressing part 55 (an example of the pressing part) is an elastic planar member formed substantially in a disk shape. The filter pressing part 55 includes an annular portion 551 of an annular shape formed at the outside in the radial direction, a protecting portion 552 formed at the inside in the radial direction, and bridge portions 553 connecting the annular portion 551 and the protecting portion 552.

The annular portion 551 forms openings 55H at the inside in the radial direction. As shown in FIG. 5, the openings 55H allow the filter membrane 541 to face the first oil chamber Y1. The annular portion 551 faces the support frame 542 of the filter part 54 and the end cap 51 at the other end side, and faces the crimped portion 43K of the piston nut 43 at the one end side.

The protecting portion 552 is formed substantially in a disk shape. The protecting portion 552 of the present embodiment has an outer diameter that is larger than a fixing member 64 (described later) of the bottom piston unit 60. The protecting portion 552 is provided at a position facing the fixing member 64 of the bottom piston unit 60 in the axial direction. The protecting portion 552 protects the filter membrane 541 from the fixing member 64.

Each bridge portion 553 is formed substantially in a linear shape with a certain width and spans the openings 55H. The bridge portions 553 support the protecting portion 552 at the inside in the radial direction of the filter pressing part 55. The bridge portions 553 may be of any other shape as long as the bridge portions 553 can support the protecting portion 552 without fully closing the openings 55H; for example, the bridge portions 553 may be formed of three linear portions extending radially.

[Configuration and Functions of the Bottom Piston Unit 60]

As shown in FIG. 1, the bottom piston unit 60 (an example of the end structure) includes a valve seat 61, a bottom valve 62 provided at the one end side of the valve seat 61, a check valve 63 provided at the other end side of the valve seat 61, and the fixing member 64 provided in the axial direction. The bottom piston unit 60 provides partition between the first oil chamber Y1 and the reservoir chamber R.

The fixing member 64 of the present embodiment is composed of a bolt and a nut. The fixing member 64 protrudes from the other end of the bottom piston unit 60 at the inside in the radial direction of the bottom piston unit 60. In other words, the fixing member 64 protrudes toward the first oil chamber Y1 at the one end side of the cylinder 11.

Now a detained description will be given of how the piston nut 43 fixes the components.

As shown in FIG. 5, in the hydraulic damper 1 of the present embodiment, the crimped portion 43K formed at the one end of the piston nut 43 allows the pressure adjustment chamber spring 53, the float valve 52, the end cap 51, the filter part 54, and the filter pressing part 55 to be held at the piston nut 43.

The crimped portion 43K presses the end cap 51 toward the other end side with the filter pressing part 55 interposed therebetween in the axial direction. The axial force generated by the crimped portion 43K presses the cap tapered portion 513 of the end cap 51 against the nut tapered portion 433T of the piston nut 43. This allows the end cap 51 of the present embodiment to be fixed to the piston nut 43 without rattling. Also, the present embodiment provides increased sealing at the contact point between the end cap 51 and the piston nut 43.

Further, the piston nut 43 fixes the filter part 54 to the end cap 51 via the filter pressing part 55. Specifically, as the crimped portion 43K presses the filter pressing part 55 against the end cap 51, the filter pressing part 55 presses the filter part 54 against the end cap 51. In particular, in the present embodiment, the filter part 54 protrudes farther toward the filter pressing part 55 than the end cap 51. This ensures that the filter pressing part 55 contacts the protruding filter part 54, allowing the filter part 54 to be pressed against and fixed to the end cap 51 without rattling. Additionally, the present embodiment provides increased sealing at the contact point between the filter part 54 and the filter pressing part 55. The present embodiment also provides increased sealing at the contact point between the filter part 54 and the end cap 51.

As shown in FIG. 6, when the piston unit 30 and the damping force changer 40 are viewed from the one end side, the crimped portion 43K is formed along the entire circumference in the circumferential direction and presses the filter pressing part 55 toward the filter part 54 and the end cap 51. The filter membrane 541 of the filter part 54 is exposed through the openings 55H of the filter pressing part 55. The protecting portion 552 is provided so as to face the inside in the radial direction of the filter membrane 541.

By the way, if a configuration is adopted in which the piston nut 43 and the end cap 51 are connected by, for example, screw tightening, a certain degree of size is required in the axial direction to form a thread groove. In the hydraulic damper 1 of the present embodiment, in contrast, the end cap 51 is fixed to the piston nut 43 using the crimped portion 43K of the piston nut 43, and this helps reduce the axial size of the damping force changer 40.

Now a description will be given of operations of the hydraulic damper 1 of the present embodiment.

Figure 7A:
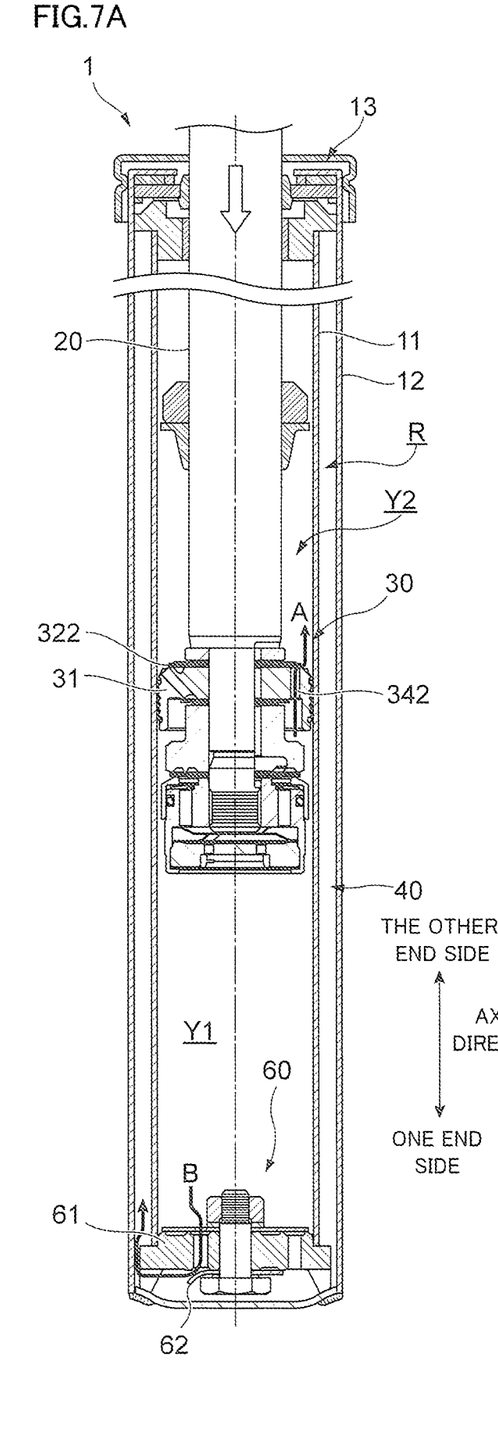
FIGS. 7A and 7B illustrate an operation of the piston unit and a bottom piston unit during a compression stroke and a tension stroke.
Figure 7B:
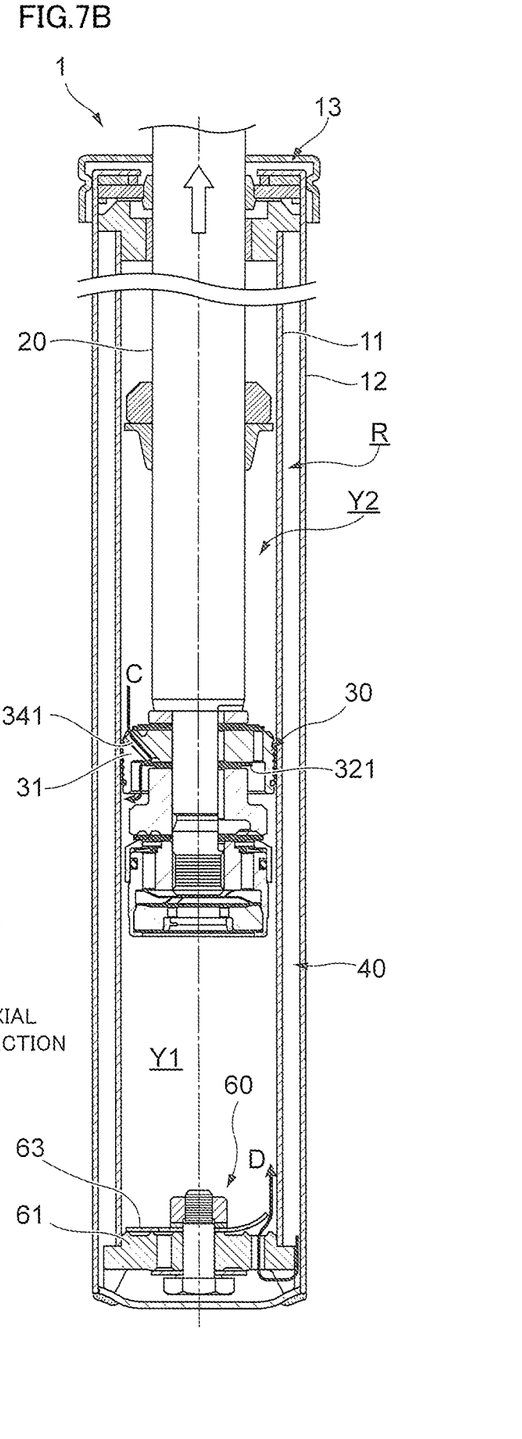

FIGS. 7A and 7B illustrate an operation of the piston unit 30 and the bottom piston unit 60 during a compression stroke and a tension stroke. FIG. 7A illustrates oil flow during a compression stroke, while FIG. 7B illustrates oil flow during a tension stroke.

As shown in FIG. 7A, when the rod 20 moves to the one end side in the axial direction relative to the cylinder 11 as indicated by a white arrow, pressure of oil in the first oil chamber Y1 increases. This causes the compression-side damping valve part 322 closing the compression-side oil channels 342 to open, causing the oil to flow into the second oil chamber Y2 through the compression-side oil channels 342 as indicated by an arrow A. The oil flow from the first oil chamber Y1 to the second oil chamber Y2 is throttled by the compression-side damping valve part 322, whereby damping force of the hydraulic damper 1 during the compression stroke is obtained.

Also, the oil in the first oil chamber Y1 with increased pressure caused by the movement of the valve seat 31 to the one end side in the axial direction opens the bottom valve 62 of the bottom piston unit 60. Thus, the oil in the first oil chamber Y1 flows out into the reservoir chamber R as indicated by an arrow B.

On the other hand, as shown in FIG. 7B, when the rod 20 moves to the other end side in the axial direction relative to the cylinder 11 as indicated by a white arrow, the pressure in the first oil chamber Y1 becomes negative due to the deficiency of oil in the volume corresponding to the movement in the first oil chamber Y1. Thus, the oil in the second oil chamber Y2 flows through the tension-side oil channels 341 of the piston unit 30 and opens the tension-side damping valve part 321 closing the tension-side oil channels 341 to enter the first oil chamber Y1 as indicated by an arrow C. This oil flow from the second oil chamber Y2 to the first oil chamber Y1 is throttled by the tension-side damping valve part 321 of the piston unit 30, whereby damping force of the hydraulic damper 1 during the tension stroke is obtained.

When the valve seat 31 moves in the direction of the white arrow in FIG. 7B, the oil in the reservoir chamber R opens the check valve 63 and enters the first oil chamber Y1 as indicated by an arrow D.

Figure 8A:
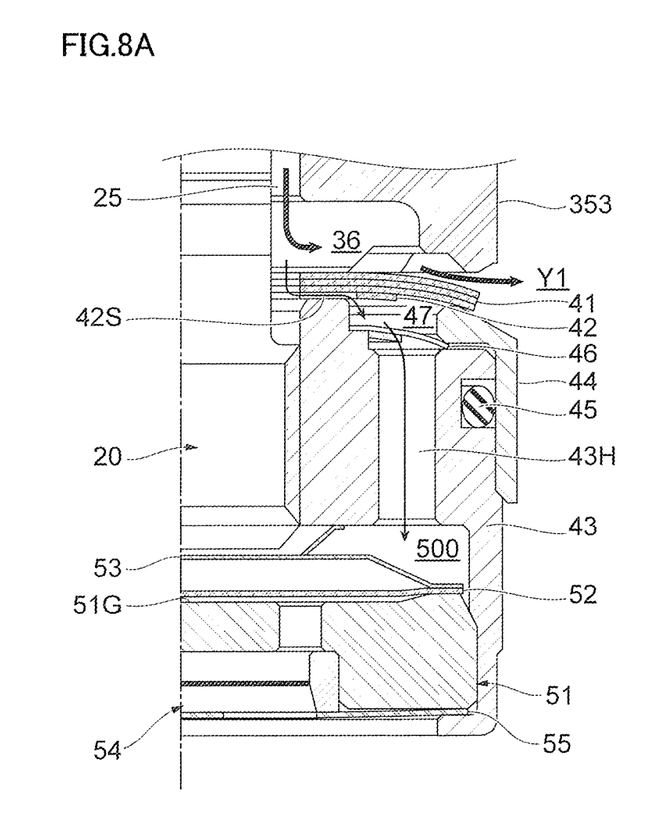
FIGS. 8A and 8B illustrate an operation of the damping force changer during a tension stroke.
Figure 8B:
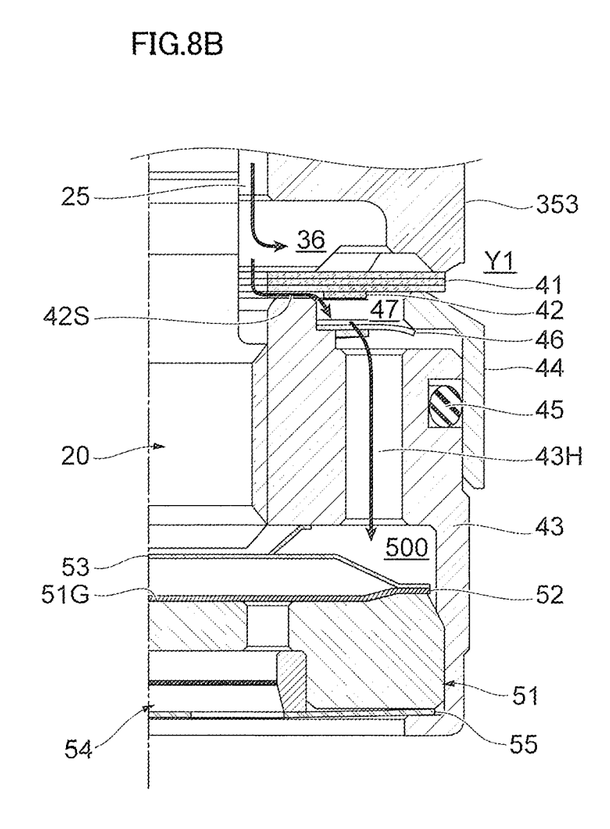

FIGS. 8A and 8B illustrate an operation of the damping force changer 40 during a tension stroke. FIG. 8A illustrates oil flow when the rod 20 reciprocates in a short range, while FIG. 8B illustrates oil flow when the rod 20 reciprocates in a long range.

When the rod 20 moves in a short reciprocation range during a tension stroke, the oil having entered the bypass path 25 from the second oil chamber Y2 passes through the orifices 42S of the throttle member 42 and the communication paths 43H of the piston nut 43 to flow into the pressure adjustment chamber 500. At this time, the pressure adjustment chamber 500 increases its oil retention capacity as the float valve 52 is deflected toward the deformation restricting portion 51G, so that the pressure of oil in the pressure adjustment chamber 500 hardly increases. Consequently, pressing force of the spool 44, which is provided on the pressure adjustment chamber 500 side, to press the adjustment valve 41 toward the discharge channel 36 becomes small. Thus, the adjustment valve 41 opens the discharge channel 36. Additionally, the oil flowing in the bypass path 25 flows out into the first oil chamber Y1 through the discharge channel 36. As such, when the rod 20 moves in a short reciprocation range, oil flow bypassing the piston unit 30 takes place.

Hence, when the rod 20 moves in a short reciprocation range during a tension stroke, the oil flows not only through the tension-side oil channels 341 of the piston unit 30 (see FIG. 7B) but also through the bypass path 25. Thus, damping force generated in the piston unit 30 becomes small.

Meanwhile, when the rod 20 moves in a long reciprocation range during a tension stroke, the oil having entered the bypass path 25 from the second oil chamber Y2 passes through the orifices 42S of the throttle member 42 and the communication paths 43H of the piston nut 43 to flow into the pressure adjustment chamber 500. When the rod 20 moves in a long reciprocation range, the float valve 52 is immediately deflected to contact the deformation restricting portion 51G in the pressure adjustment chamber 500, so that the pressure of oil in the pressure adjustment chamber 500 increases. Consequently, pressing force of the spool 44, which is provided on the pressure adjustment chamber 500 side, to press the adjustment valve 41 toward the discharge channel 36 becomes large. Thus, the adjustment valve 41 closes the discharge channel 36.

Hence, when the rod 20 moves in a long reciprocation range during a tension stroke, the oil does not flow through the bypass path 25 but flows only through the tension-side oil channels 341 of the piston unit 30 (see FIG. 7B). Thus, damping force generated in the piston unit 30 becomes large.

During a compression stroke, pressure in the first oil chamber Y1 becomes larger than pressure in the pressure adjustment chamber 500. This causes the oil to flow into the pressure adjustment chamber 500 from the first oil chamber Y1 through the through-holes 51H provided in the end cap 51. At this time, the float valve 52 moves against the pressure adjustment chamber spring 53 and comes away from the deformation restricting portion 51G.

As described above, when the rod 20 moves a little, such as when the vehicle is traveling on rough roads, the hydraulic damper 1 of the present embodiment produces small damping force, which increases driving comfort. On the other hand, when the rod 20 moves greatly, such as when the vehicle is traveling on a curve, the hydraulic damper 1 of the present embodiment produces large damping force, which increases steering stability of the vehicle.

Now a description will be given of an assembling procedure for manufacture of the hydraulic damper 1 of the present embodiment.

Figure 9A:
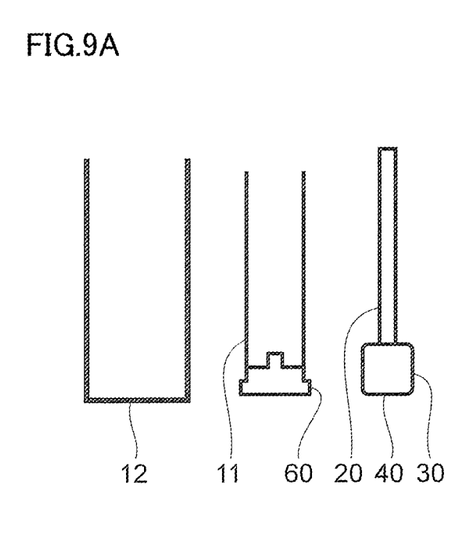
FIGS. 9A to 9C illustrate an assembling procedure for the hydraulic damper of the embodiment.
Figure 9B:
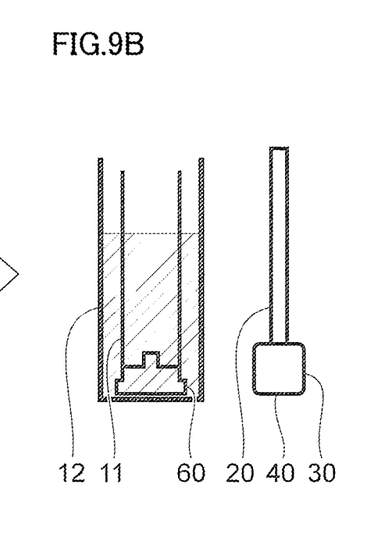
Figure 9C:
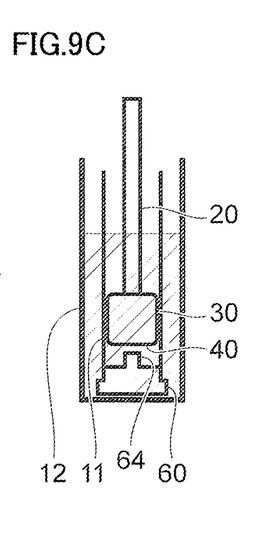

FIGS. 9A to 9C illustrate an assembling procedure for the hydraulic damper 1 of the present embodiment.

As shown in FIG. 9A, the damper case 12 mounted with the bottom cover 14, the cylinder 11 mounted with the bottom piston unit 60, and the rod 20 mounted with the piston unit 30 and the damping force changer 40 are prepared.

Then, as shown in FIG. 9B, the cylinder 11 mounted with the bottom piston unit 60 is inserted into the damper case 12, and oil is filled in the damper case 12. In the hydraulic damper 1 of the present embodiment, the end cap 51, the filter part 54, and the filter pressing part 55 are already integrated with the use of the crimped portion 43K (see FIG. 5) of the piston nut 43. The hydraulic damper 1 of the present embodiment thus allows for easy handling of the rod 20, the piston unit 30, and the damping force changer 40.

Then, as shown in FIG. 9C, the rod 20 is inserted into the cylinder 11. During this work, the damping force changer 40 may contact the fixing member 64 of the bottom piston unit 60. However, the hydraulic damper 1 of the present embodiment includes, at the end of the damping force changer 40, the filter pressing part 55 including the protecting portion 552 at the one end side of the filter part 54. Hence, even when the damping force changer 40 contacts the fixing member 64 of the bottom piston unit 60, the protecting portion 552 protects the filter membrane 541 of the filter part 54. The hydraulic damper 1 of the present embodiment thus prevents damage to the filter membrane 541.

Then, the rod guide unit 13 is mounted to the other end of the cylinder 11, and gas is injected into the reservoir chamber R. This completes assembly of the hydraulic damper 1.

The structures of the piston unit 30 and the bottom piston unit 60 are not limited to those in the above embodiment, and the piston unit 30 and the bottom piston unit 60 may have any other shape and configuration that allow them to act as a damping mechanism.

The damping force changer 40 of the present embodiment is configured to adjust damping force of the piston unit 30 connected to the rod 20. However, the damping force changer 40 is not limited to such usage. For example, the functions of the damping force changer 40 of the present embodiment may be used for adjustment of damping force generated in the bottom piston unit 60.

In the present embodiment, the float valve 52 is deformed or displaced to change the oil pressure inside the pressure adjustment chamber 500. However, the use of the float valve 52 is not essential. Use may be made of any other member that can change the oil pressure inside the pressure adjustment chamber 500.

The filter pressing part 55 may be of any other shape than the substantially circular, planar member as in the present embodiment, as long as the filter pressing part 55 can press the filter part 54 and protect the filter membrane 541. For example, the filter pressing part 55 may be a ring-shaped member or a triangular, deformed wire rod.

The functions of the piston unit 30 and the damping force changer 40 provided inside the cylinder 11 may be provided outside of the cylinder 11. Further, the hydraulic damper 1 of the present embodiment is not limited to a so-called double tube structure composed of the cylinder 11 and the damper case 12 each being of a cylindrical shape, and may have a so-called triple tube structure composed of the cylinder 11, the damper case 12, and another cylindrical body provided therebetween and forming oil channels.

REFERENCE SIGNS LIST

1 Hydraulic damper
11 Cylinder
20 Rod
30 Piston unit
31 Valve seat
40 Damping force changer
43 Piston nut
43K Crimped portion
51 End cap
52 Float valve
54 Filter part
55 Filter pressing part

The invention claimed is:

1. A hydraulic damper comprising:
a rod configured to be inserted into a cylinder containing liquid, the rod being provided so as to be movable relative to the cylinder in an axial direction;
a piston configured to be connected to the rod and partition a space inside the cylinder into a first liquid chamber and a second liquid chamber each containing the liquid;
a channel forming part configured to form a channel for the liquid between the first liquid chamber and the second liquid chamber;
a valve part configured to open and close the channel in the channel forming part and generate damping force; and
a damping force changer including an inflow part into which the liquid flows, the damping force changer being configured to change the damping force generated in the valve part by using pressure of the liquid in the inflow part, wherein
the damping force changer includes:
a pressure changing part configured to change pressure of the liquid in the inflow part by being deformed or displaced;
a support part configured to support the pressure changing part;
an inflow forming part configured to hold the support part by a crimped portion that is crimped and to form the inflow part jointly with the support part;
a filter part including a filter, the filter being provided in a channel through which the liquid flows into the inflow part and being configured to collect foreign matters contained in the liquid, the filter part being held at the inflow forming part by the crimped portion along with the support part; and a pressing part interposed between the crimped portion of the inflow forming part and the support part and configured to press the filter part.

2. The hydraulic damper according to claim 1, wherein the pressing part is an elastic planar member.

3. The hydraulic damper according to claim 1, wherein the filter part protrudes farther toward the pressing part than the support part.

4. The hydraulic damper according to claim 1, further comprising an end structure disposed at an end of the cylinder opposite to an end thereof provided with the rod, wherein
the pressing part is provided between the end structure and the filter part and includes a facing portion facing the end structure.

5. The hydraulic damper according to claim 1, wherein
the support part includes a first tapered portion at a position different from the crimped portion, and
the inflow forming part includes a second tapered portion facing the first tapered portion of the support part.

6. The hydraulic damper according to claim 2, wherein the filter part protrudes farther toward the pressing part than the support part.

7. The hydraulic damper according to claim 2, further comprising an end structure disposed at an end of the cylinder opposite to an end thereof provided with the rod, wherein
the pressing part is provided between the end structure and the filter part and includes a facing portion facing the end structure.

8. The hydraulic damper according to claim 3, further comprising an end structure disposed at an end of the cylinder opposite to an end thereof provided with the rod, wherein
the pressing part is provided between the end structure and the filter part and includes a facing portion facing the end structure.

9. The hydraulic damper according to claim 6, further comprising an end structure disposed at an end of the cylinder opposite to an end thereof provided with the rod, wherein
the pressing part is provided between the end structure and the filter part and includes a facing portion facing the end structure.

* * * * *